(12) United States Patent
Yaguchi et al.

(10) Patent No.: US 10,843,564 B2
(45) Date of Patent: Nov. 24, 2020

(54) CONTROL SYSTEM FOR ALL-WHEEL DRIVE VEHICLE

(71) Applicant: GKN Driveline Japan Ltd., Tochigi (JP)

(72) Inventors: Yuu Yaguchi, Tochigi (JP); Takahiro Nagaoka, Tochigi (JP); Yasumasa Narita, Tochigi (JP)

(73) Assignee: GKN Automotive Ltd., Birmingham (GB)

( * ) Notice: Subject to any disclaimer, the term of this patent is extended or adjusted under 35 U.S.C. 154(b) by 0 days.

(21) Appl. No.: 16/508,420

(22) Filed: Jul. 11, 2019

(65) Prior Publication Data

US 2020/0070655 A1 Mar. 5, 2020

(30) Foreign Application Priority Data

Aug. 28, 2018 (JP) ................................ 2018-158922

(51) Int. Cl.
| | |
|---|---|
| *B60K 23/08* | (2006.01) |
| *B60K 17/346* | (2006.01) |
| *B60K 17/35* | (2006.01) |
| *B60W 10/119* | (2012.01) |
| *F16D 23/02* | (2006.01) |

(52) U.S. Cl.
CPC ........ *B60K 23/0808* (2013.01); *B60K 17/346* (2013.01); *B60K 17/3505* (2013.01); *B60W 10/119* (2013.01); *F16D 23/02* (2013.01); *B60K 2023/0825* (2013.01); *B60K 2023/0858* (2013.01); *B60W 2300/18* (2013.01)

(58) Field of Classification Search
None
See application file for complete search history.

(56) References Cited

U.S. PATENT DOCUMENTS

| | | | |
|---|---|---|---|
| 8,177,672 B2 * | 5/2012 | Kato | B60K 17/344 |
| | | | 475/198 |
| 9,352,648 B2 * | 5/2016 | Bruhl | B60K 23/08 |
| 9,481,243 B2 * | 11/2016 | Larkin | B60K 23/0808 |
| 2012/0260758 A1* | 10/2012 | Arai | B60K 23/08 |
| | | | 74/405 |
| 2013/0220722 A1 | 8/2013 | Mita | |
| 2015/0073670 A1* | 3/2015 | Matsuno | B60K 17/35 |
| | | | 701/53 |

(Continued)

FOREIGN PATENT DOCUMENTS

| | | |
|---|---|---|
| JP | 2013-177093 A | 9/2013 |
| JP | 2018-013175 A | 1/2018 |
| JP | 2019-026151 A | 2/2019 |

*Primary Examiner* — Justin Holmes
(74) *Attorney, Agent, or Firm* — Bejin Bieneman PLC

(57) ABSTRACT

A vehicle includes a first axle temporary driven by a motor, a second axle permanently connected to the motor via a propeller shaft, and a sub-shaft that connects the propeller shaft and the first axle. A control system for a connection between the motor and the first axle includes a first clutch between the propeller shaft and the sub-shaft, a second clutch between the sub-shaft and the first axle. The first clutch is controlled to continue applying a synchronous torque until the second clutch is determined to be connected. The second clutch is controlled to be connected in response to a determination that the second clutch is connectable.

10 Claims, 8 Drawing Sheets

(56) References Cited

U.S. PATENT DOCUMENTS

2016/0101689 A1\* 4/2016 Yoshimura ........... B60K 17/344
 74/665 F
2016/0297300 A1\* 10/2016 Tamura .............. B60K 23/0808
2019/0039621 A1 2/2019 Takahashi et al.

\* cited by examiner

CONTROL SYSTEM FOR ALL-WHEEL DRIVE VEHICLE

CROSS-REFERENCE TO RELATED APPLICATIONS

This application claims priority under 35 USC § 119 to Japanese Patent Application No. 2018-158922, filed on Aug. 28, 2018, the contents of which are incorporated herein by reference in their entirety.

TECHNICAL FIELD

The following disclosure relates to a control system for controlling a connection between a motor and an axle in an all-wheel drive vehicle, including a control system for controlling connection and disconnection of a front axle in a rear-wheel drive based all-wheel drive vehicle.

BACKGROUND

A four-wheel drive (4WD) vehicle using all four wheels as drive wheels has long been in use in order to improve bad road travel performance of a two-wheel drive (2WD) vehicle. Although all-wheel drive (AWD) is originally a term that encompasses all cases with four or more drive wheels, including 4WD, a vehicle that performs torque distribution using electronic control may be referred to as AWD to distinguish from conventional 4WD.

If all the wheels are used as drive wheels, poor road travel performance is improved, but loss of energy efficiency is inevitable. Therefore, an AWD vehicle is proposed, which normally travels in a 2WD mode and includes a mechanism for shifting temporarily from the 2WD mode to an AWD mode under driver operation or automatic control. A clutch may be used to connect and disconnect torque transmission when mode-switching, and a non-slip clutch may be used to avoid enemy loss due to slippage. Since the non-slip clutch cannot be connected when a rotational speed difference occurs between clutch teeth, control is performed to synchronize rotation prior to connection.

JP-2013-177093-A and JP-2018-013175-A disclose related techniques.

Of course, control to synchronize rotation is preferably carried out quickly. On the other hand, if the control is poor, an impact or vibration change occurs in a transmission torque during a process of connecting the non-slip clutch, which may cause discomfort to an occupant.

SUMMARY

A control system can be configured to control a connection between a motor and a first axle in an all-wheel drive vehicle that includes the first axle temporary driven by the motor, a second axle permanently connected to the motor via a propeller shaft, and a sub-shaft that drivingly connects the propeller shaft and the first axle.

In an example, the control system may include a first clutch configured to disconnectably connect the propeller shaft and the sub-shaft, a second clutch configured to disconnectably connect the sub-shaft and the first axle, a synchrony determination unit configured to determine whether the second clutch is connectable, a connection determination unit configured to determine whether the second clutch is connected, a first control unit configured to control the first clutch to continue applying a synchronous torque from the propeller shaft to the sub-shaft until the connection determination unit determines that the second clutch is connected, and a second control unit configured to control to connect the second clutch in response to a determination of the synchro determination unit that the second clutch is connectable.

In an example, switching between two-wheel drive and all-wheel drive can be quickly performed without causing a significant change in the transmission torque.

DESCRIPTION

Some exemplary embodiments are described below with reference to the accompanying drawings.

In the following description, a control system for controlling connection and disconnection of a front axle in a rear-wheel drive based all-wheel drive vehicle will be described, and a similar system can also be applied to a front-wheel drive based vehicle.

Figure 1:
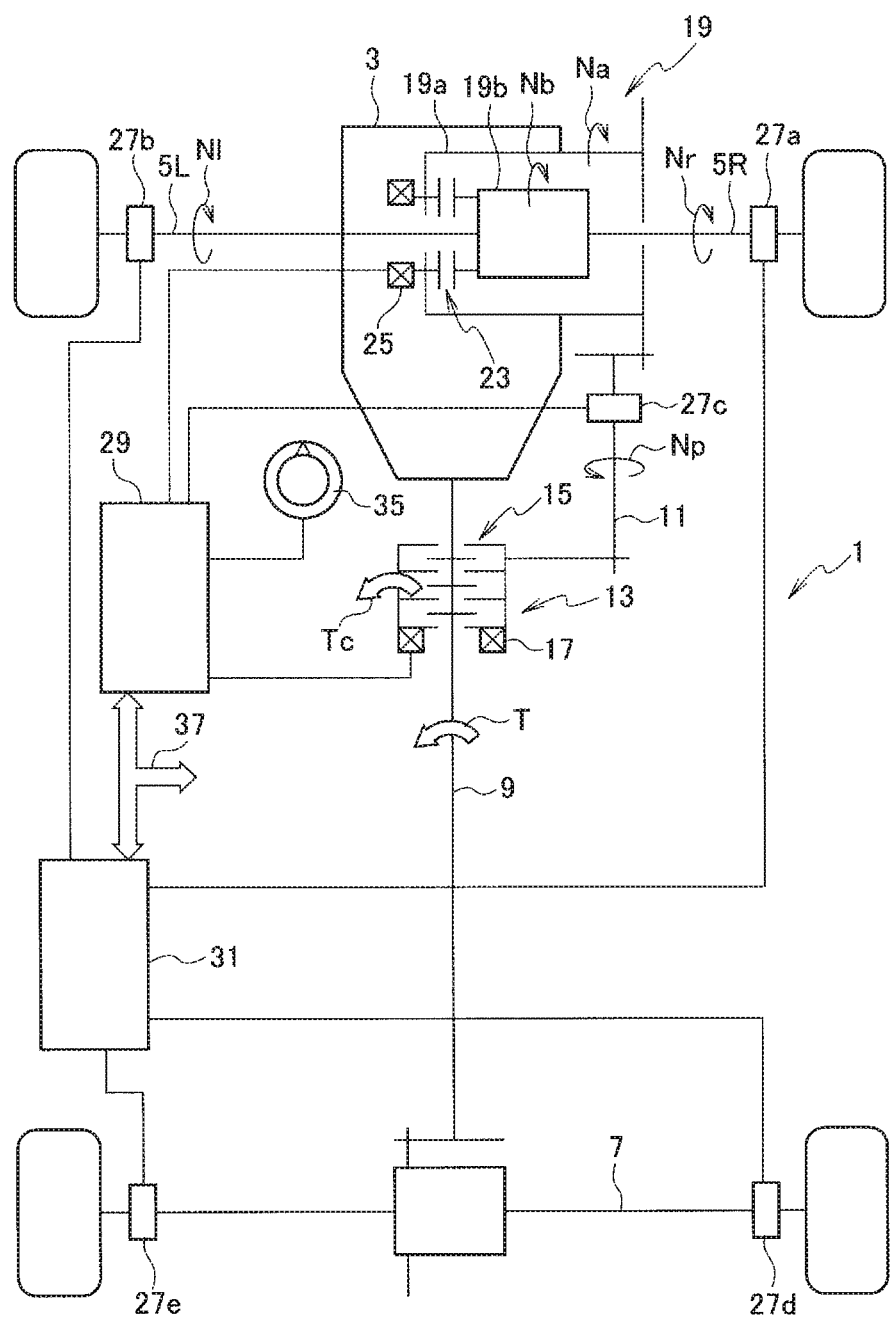
FIG. 1 is a schematic block diagram of a vehicle according to an embodiment.

With reference to FIG. 1, a vehicle for example includes a control system 1, a motor 3, front axles (first axles) 5R and 5L temporary driven by the motor 3, a rear axle (second axle) 7 permanently connected to the motor 3 via a propeller shaft 9, and a sub-shaft 11 that drivingly communicates with the propeller shaft 9 and the front axles 5R and 5L. In the vehicle, the control system 1 controls connection between the motor 3 and the front axles 5R and 5L.

The vehicle also includes a coupling 13 that mediates torque transmission from the propeller shaft 9 to the sub-shaft 11. The coupling 13 includes a friction clutch (a first clutch) 15 such as a multi-plate clutch, and a drive device (a first drive device) 17 that drives the friction clutch 15. One side of the friction clutch 15 is coupled to the propeller shaft 9, and the other side is drivingly coupled to the sub-shaft 11 via a gear coupling or a sprocket and the like. When a pressing force is applied to the first clutch 15 by the first drive device 17, a torque transmitted by the first clutch 15 increases or decreases in accordance with increase or decrease of the pressing force, so that the coupling 13 can quantitatively control the torque transmission from the propeller shaft 9 to the sub-shaft 11. That is, controlling a transmission torque Tc via the first clutch 15 is equivalent to controlling the pressing force on the first clutch 15 by the first drive device 17 so as to obtain an expected transmission torque Tc, so that these may be referred to interchangeably.

The vehicle also includes a disconnectable differential 19 coupled to the front axles 5R and 5L. An outer case 19a is gear-coupled to the sub-shaft 11, and can receive the transmitted torque. An inner case 19b can freely rotate relative to the outer case 19a, and a second clutch 23 is interposed between the outer case 19a and the inner case 19b. Since the present embodiment improves a problem of synchronization of a non-slip clutch, the non-slip clutch, such as a dog clutch, can be suitably applied to the second clutch 23. In addition, a friction clutch such as a cone clutch or a multi-plate clutch can be applied to the second clutch 23, thereby reducing energy loss during connection.

The differential 19 further includes a drive device (a second drive device) 25 to control connection and disconnection of the clutch 23. The differential 19, while allowing differential between the right front axle 5R and the left front axle 5L, distributes the torque input to the two front axles 5R and 5L when the second clutch 23 is connected. That is, the vehicle travels in an AWD mode. When the second clutch 23 is disconnected, no torque is transmitted to the front axles 5R and 5L, so that the vehicle travels in a 2WD mode.

Figure 2:
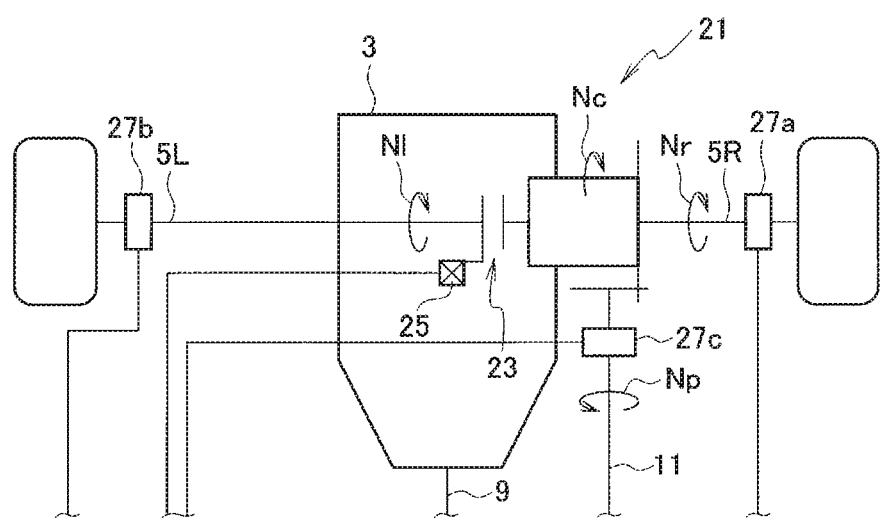
FIG. 2 is a schematic block diagram of a front axle and related components according to another embodiment.

Alternatively, as shown in FIG. 2, an axle disconnection device 21 can be applied to the front axles 5R and 5L. In the device 21, a differential gear does not change in that the differential gear allows the differential between the right front axle 5R and the left front axle 5L, but the second clutch 23 is interposed in the left front axle 5L (or the right front axle 5R), and the differential gear is directly gear-coupled to the sub-shaft 11. When the second clutch 23 is connected, the axle disconnection device 21 transmits the torque to both front axles 5R and 5L (AWD mode), but no torque is transmitted (2WD mode) since the right front axle 5R and the left front axle 5L can freely rotate independently when the second clutch 23 is disconnected.

In any case, the control system 1 includes the first clutch 15 that disconnectably connects the propeller shaft 9 and the sub-shaft 11, and a second clutch 23 that disconnectably connects the sub-shaft 11 and the first axles 5R and 5L.

Figure 3:
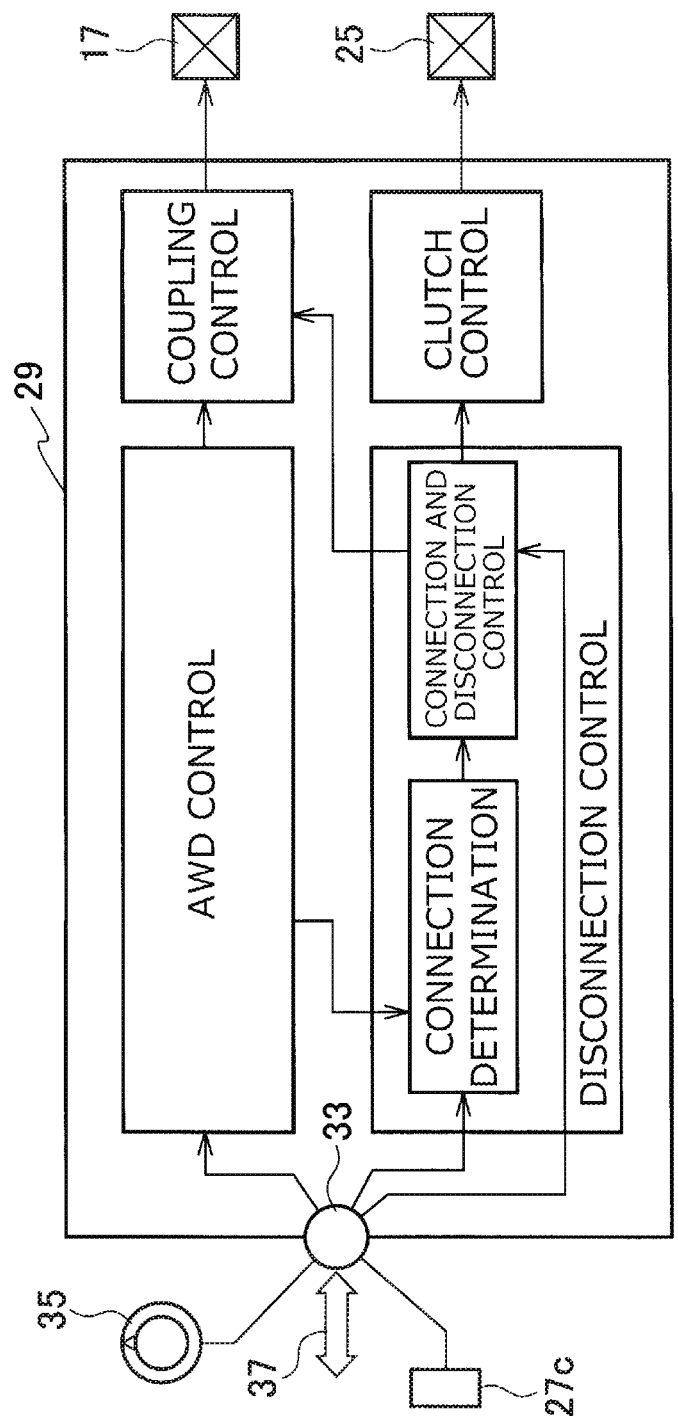
FIG. 3 is a block diagram of an electronic control unit (ECU) and related components.

With reference to FIG. 3 in combination with FIGS. 1 and 2, the control system 1 also includes a determination unit that determines whether the second clutch 23 is connectable or connected, a first control unit that controls the first drive device 17 (that is, the first clutch 15), and a second control unit that controls a second drive device 25 (that is, the second clutch 23).

The first control unit is configured to control the first clutch 15 to continue applying a constant synchronous torque Ts from the propeller shaft 9 to the sub-shaft 11 until the determination unit determines that the second clutch 23 is connected. The second control unit is configured to connect the second clutch 23 in response to a determination of the determination unit that the second clutch 23 is connectable. As will be described below, these units may be respective independent application specific electronic circuits, and may be realized by an electronic control unit (ECU) that operates in cooperation with software. The ECU normally includes at least a communication device that communicates with other devices and a processor that operates based on software. An example of the ECU will be described below.

With reference back to FIG. 1 and in combination with FIG. 3, the vehicle includes a plurality of ECUs, one of which is an all-wheel drive control device 29. The control device 29 is electrically connected to the first and second drive devices 17 and 25, and controls the first and second drive devices 17 and 25. The control device 29 is electrically connected to a mode switch 35 at a driver seat via a communication device 33, and is configured to receive a connection request and a disconnection request based on operation of the mode switch 35 by a driver. Alternatively, the connection request and disconnection request may be based on automatic control instead of manual operation, in which case the control device 29 may be configured to receive a connection request and a disconnection request issued by itself or by another ECU.

The control device 29 is also connected to another control device, for example, an anti-lock brake system (ABS) control device 31, via a controller area network (CAN) communication bus 37, and can acquire information such as rotational speed data acquired by the control device 31 via CAN communication. The control device 29 is connected to rotational speed sensors 27a to 27e either directly or via the CAN communication bus 37, and rotational speeds Nr, Nl, Np and the like of the shafts 5R, 5L and 11 can be acquired as needed.

Figure 4:
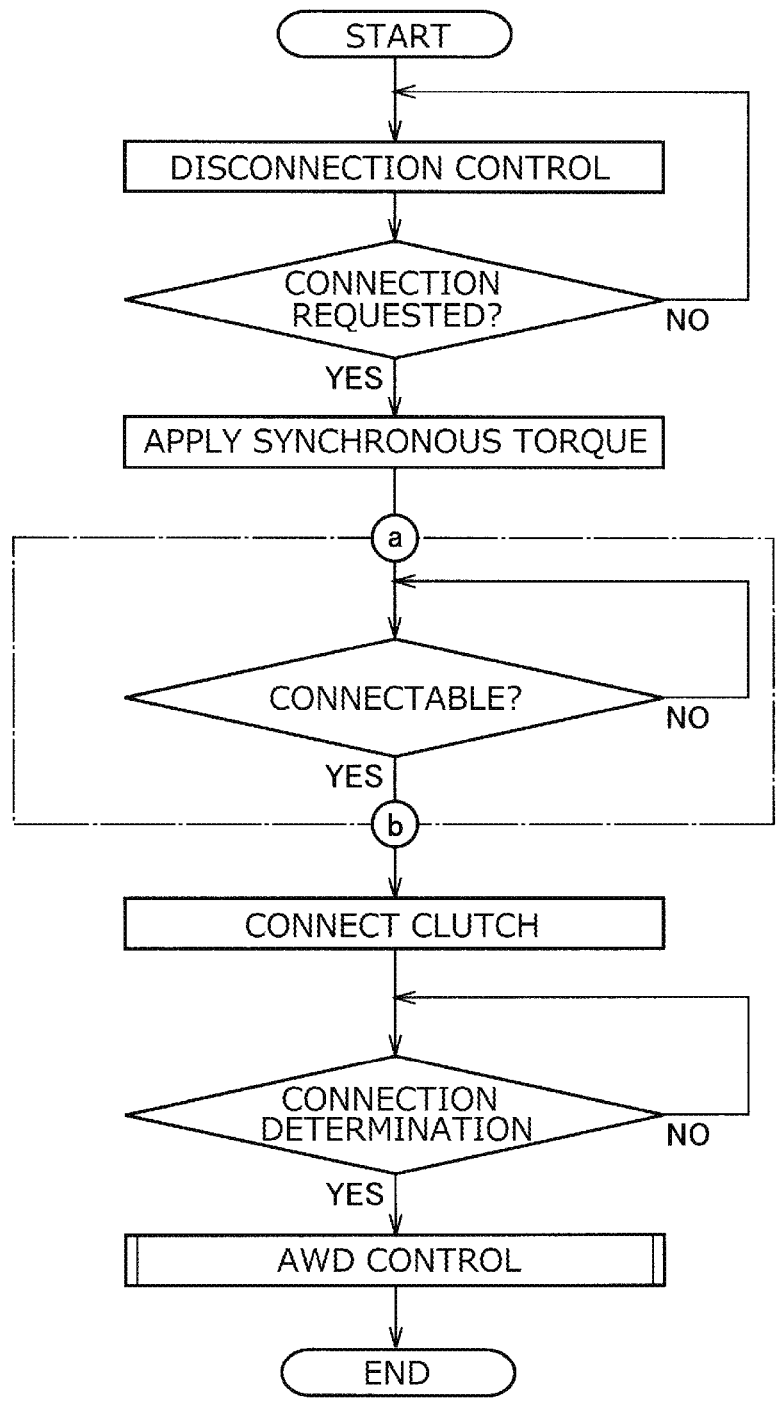
FIG. 4 is a flowchart showing control for connecting the front axle to a drive system.

When shifting from the 2WD mode to the AWD mode, the all-wheel drive control device 29 operates, for example, according to an algorithm shown in FIG. 4. The following algorithm may be executed only by the control device 29, or may be executed in cooperation with other ECUs.

Figure 8:
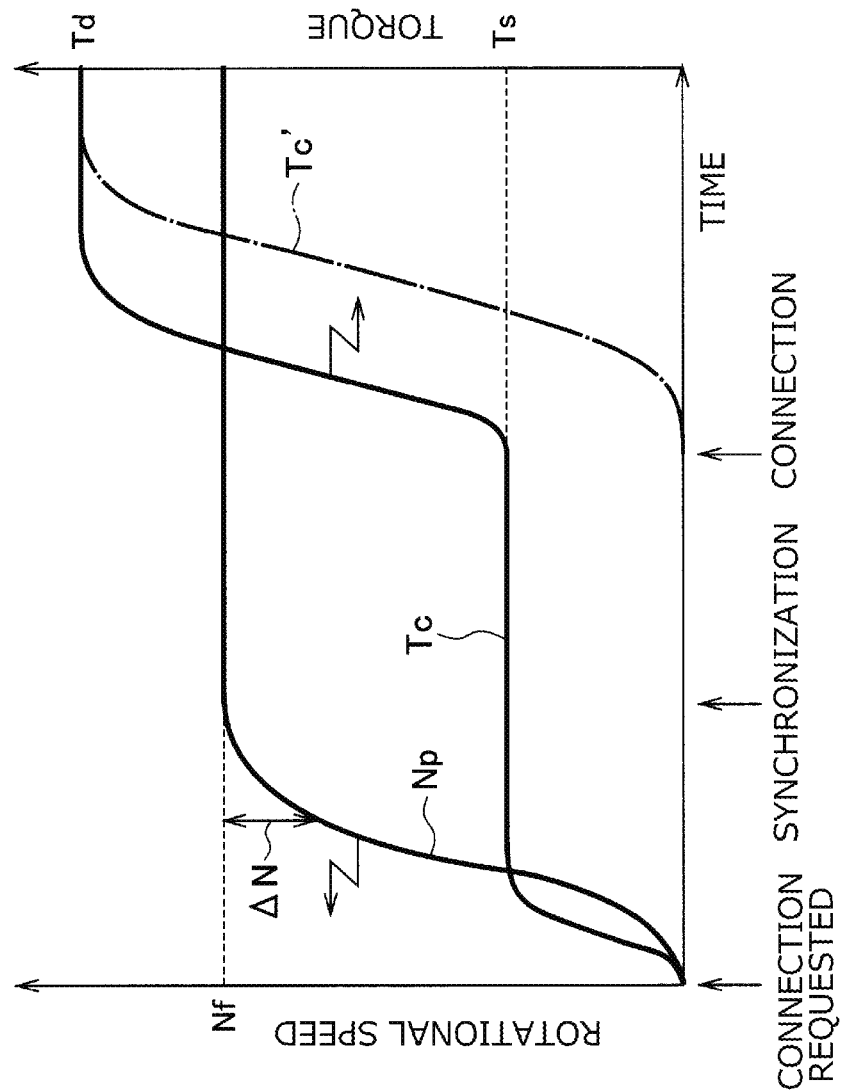
FIG. 8 is a graph showing transition of a rotational speed and a transmission torque during a process of connecting the front axle to the drive system.

That is, the control device 29 maintains the second clutch 23 disconnected until a connection request is received. With reference to FIG. 8 in combination with FIGS. 1 and 4, the torque Tc transmitted through the coupling 13 at this time is substantially zero, and no torque is applied to the sub-shaft 11 from anywhere, so that the rotational speed Np is also substantially zero to very low. Although this is remarkably advantageous for saving fuel in the vehicle, the second clutch 23 normally cannot be connected in this state since a rotational speed Na of the outer case 19a and a rotational speed Nb of the inner case 19b are considerably different.

When the connection request is received, the control device 29 controls the first drive device 17 to appropriately connect the first clutch 15, extracts a part of a torque T transmitted by the propeller shaft 9 as the synchronous torque Ts for synchronizing the second clutch 23, and applies the torque to the sub-shaft 11. The sub-shaft 11 spins up due to action of the synchronous torque Ts and eventually reaches a rotational speed Nf that synchronizes the second clutch 23, and connection thereof is possible.

The control device 29 controls the first clutch 15 to continue applying the synchronous torque Ts until the connection is possible. The synchronous torque Ts is smaller than a drive torque Td applied under AWD control described later, but is an appropriate torque sufficient to spin up the sub-shaft 11, and can be determined in advance in accordance with mass and moment of inertia of a drive system, and the like. The synchronous torque Ts can be kept constant before and after the connection. This is advantageous for both preventing a transmission torque change and quickly increasing a transmission torque, as described below. Alternatively, giving priority to any of these, the second clutch 23 may be connected while decreasing or increasing the synchronous torque as time passes.

Figure 5:
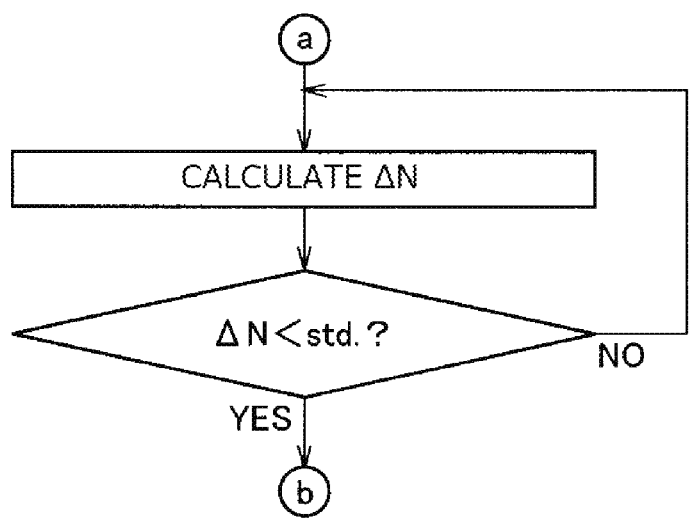
FIG. 5 is a flowchart showing an example of a procedure for determining synchrony in a clutch.

Next, whether the second clutch 23 is connectable is determined. With reference to FIG. 5 in combination with FIG. 4, the determination can be made based on a rotational speed difference $\Delta N$ between clutch teeth. For example, in a case of the differential 19 shown in FIG. 1, the rotational speed Na of the outer case 19a can be calculated by multiplying the rotational speed Np of the sub-shaft 11 by a gear ratio, and the rotational speed Nb of the inner case 19b can be calculated as an average of the rotational speeds Nr and Nl of the front axles 5R and 5L. The rotational speed difference $\Delta N$ can be calculated as a difference between Na and Nb. Alternatively, in a case of the axle disconnection device 21 shown in FIG. 2, a rotational speed Nc of a differential gear case can be calculated from the rotational speed Np, and the rotational speed difference ΔN can be calculated as a difference between Nc and the rotational speed Nl of the front axle 5L. Alternatively, instead of calculating from rotational speeds of the axles or shafts, for example, a sensor that detects the rotational speeds Na and Nb may be used to calculate from those output values, or a sensor that directly detects the rotational speed difference ΔN may be used. When the rotational speed difference ΔN is smaller than an appropriately determined reference value, it can be determined that the connection is possible.

With reference back to FIG. 4, when it is determined that second clutch 23 is connectable (that is, synchronized), the control device 29 controls the second drive device 25 to connect the second clutch 23.

The control device 29 controls the first clutch 15 to continue applying the constant synchronous torque Ts to the sub-shaft until the connection is possible. When the second clutch 23 is connected, the synchronous torque Ts is rapidly applied to the front axles 5R and 5L, and the connection is performed in a fully synchronized state and the first clutch 15 is a friction clutch to allow some slippage. Therefore, an impact or vibration change does not occur in the transmission torque, and an occupant does not feel uncomfortable.

Subsequently, the control device 29 determines Whether the second clutch 23 is connected. The rotational speed difference ΔN can also be used for the determination. For example, it can be determined that the connection is established when the rotational speed difference ΔN is smaller than a reference value. This reference value can be smaller than the reference value used to determine whether the connection is possible.

Figure 6:
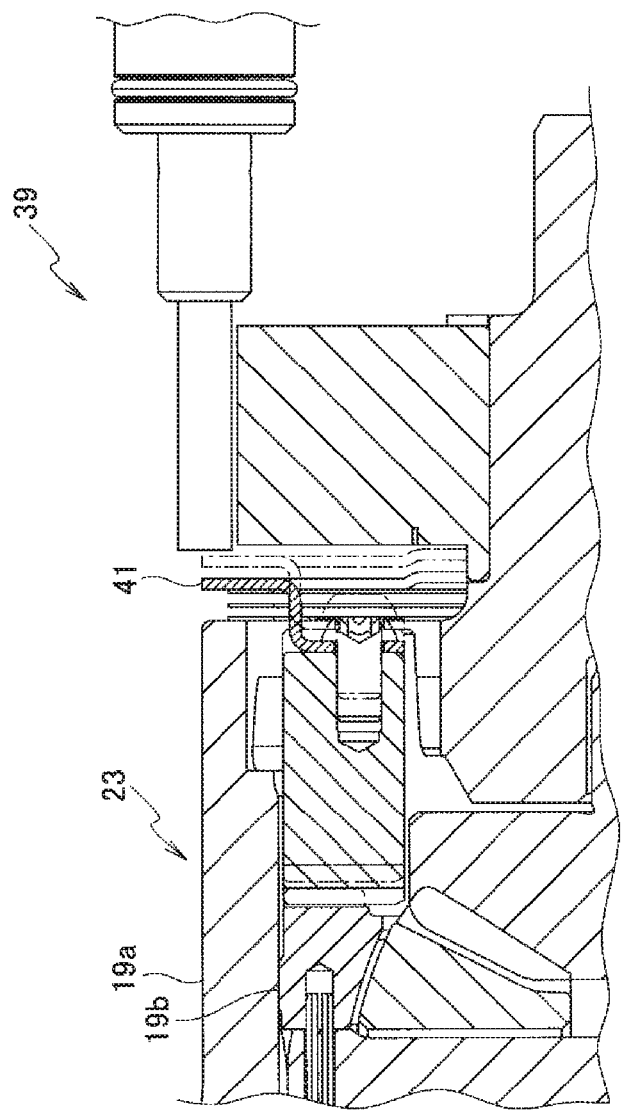
FIG. 6 is a partial cross-sectional view of a sensor that detects connection and disconnection of the clutch, and related components.

Alternatively, the determination can be made by a physical switch. For example, as illustrated in FIG. 6, the flange 41 is fixed to a movable clutch tooth side of the second clutch 23, and the determination can be made using output of a proximity sensor 39 disposed adjacent thereto. Of course, a mechanical switch can be used instead of the proximity sensor. Further alternatively, the determination may be a connection determination when the second drive device 25 is confirmed to be energized or when a predetermined time has elapsed since start of energization.

With reference back to FIG. 4, the control device 29 passes control to an algorithm for AWD control in response to the determination that the second clutch 23 is connected. Under the AWD control algorithm, the transmission torque Tc is controlled, and as shown in FIG. 8, the transmission torque Tc increases to the drive torque Td that is larger than the synchronous torque Ts.

The process of increasing the transmission torque is expected to be sufficiently quick as compared to that of the prior art. This is because if it is intended to avoid an impact or vibration change in the transmission torque, a transmission torque Tc' must increase relatively slowly, as shown by a one-dotted line in FIG. 8. According to the embodiment, since the torque starts to increase at least from a state where the synchronous torque Ts is transmitted, time until the drive torque Td is reached is shortened.

Figure 7:
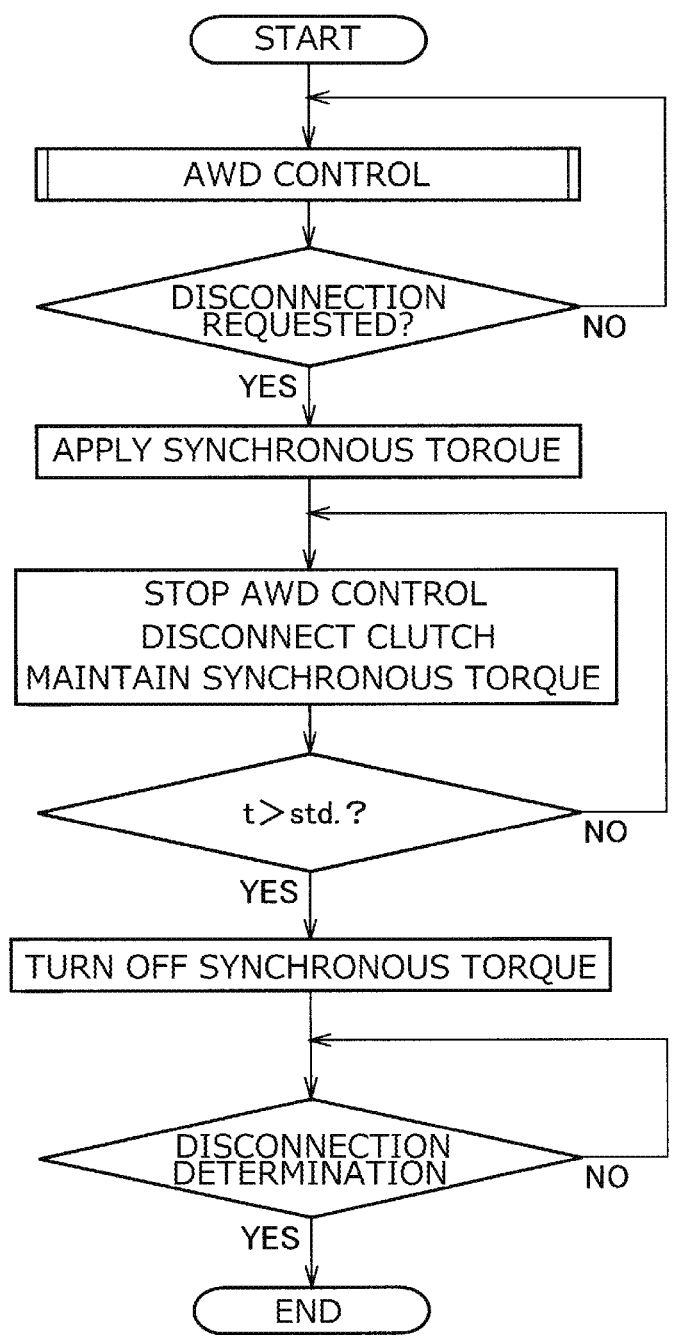
FIG. 7 is a flowchart showing control for disconnecting the front axle from the drive system.

When the vehicle shifts from the AWD mode to the 2WD mode, the control device 29 operates, for example, according to the algorithm shown in FIG. 7.

That is, the control device 29 maintains control by the AWD control algorithm until a disconnection request is received. When the disconnection request is received, the AWD control algorithm is stopped to shift to a disconnection algorithm. The control device 29 controls the first drive device 17 to weaken connection of the first clutch 15, and reduces the transmission torque Tc from Id to a synchronous torque. The synchronous torque may be the same as the above-described synchronous torque Ts, or may be suitably different. A constant synchronous torque may be maintained, or the synchronous torque may be decreased or increased as time passes. In parallel with or subsequent to this, the control device 29 controls the second drive device 25 to disconnect the second clutch 23.

Since the control device 29 does not completely disconnect the first clutch 15 until then, a certain amount of torque continues to be applied to the sub-shaft 11. Since the torque applied to the two front axles 5R and 5L does not rapidly disappear, the vehicle does not swing and the occupant does not feel uncomfortable.

Subsequently, the control device 29 determines whether the second clutch 23 is disconnected. The determination may be made when a relatively short time has elapsed since the second drive device 25 is de-energized or a start of de-energization, or, as described above, the determination may be made based on the rotational speed difference ΔN, or the determination may be made by a physical switch.

In response to the determination that the second clutch 23 is disconnected, the control device 29 controls the first drive device 17 to further weaken the connection of the first clutch 15 to make the transmission torque zero (turn off the synchronous torque). The control device 29 determines that the first clutch 15 is disconnected, and ends disconnection control. Alternatively, a disconnection determination can be omitted.

As understood from the above, according to the embodiment, when switching between the 2WD mode and the AWD mode, an impact or vibration change in the transmission torque accompanying connection and disconnection of the clutch can be prevented, and thus the occupant can be prevented from feeling uncomfortable. In addition, the switching can be performed quickly. Further, the system can be realized by combining a friction clutch, a non-slip clutch, and an ECU, and addition of a new device is not required, so that cost is saved and weight of the vehicle is not increased.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

According to an aspect of the present disclosure, a control system is provided, which can quickly switch between the 2WD mode and the AWD mode while preventing an impact or vibration change in the transmission torque.

What is claimed is:

1. A control system configured to control a connection between a motor and a first axle in an all-wheel drive vehicle that includes the first axle temporary driven by the motor, a second axle permanently connected to the motor via a propeller shaft, and a sub-shaft that drivingly connects the propeller shaft and the first axle, the control system comprising:

a first clutch configured to disconnectably connect the propeller shaft and the sub-shaft;

a second clutch configured to disconnectably connect the sub-shaft and the first axle;
a synchrony determination unit configured to determine that the second clutch is connectable;
a connection determination unit configured to determine that the second clutch is connected;
a first control unit configured to control the first clutch to continue applying a first torque from the propeller shaft to the sub-shaft until the connection determination unit determines that the second clutch is connected;
a second control unit configured to connect the second clutch in response to a determination of the synchro determination unit that the second clutch is connectable; and
a sensor connected to the synchro determination unit to detect a rotational speed difference in the first clutch;
wherein the synchro determination unit is configured to calculate the rotational speed difference based on a signal of the sensor, and to determine that the second clutch is connectable upon determining that the rotational speed difference is smaller than a reference value.

2. The control system according to claim 1, wherein the first clutch is a friction clutch and the second clutch is a dog clutch.

3. The control system according to claim 1, wherein the first control unit is configured to control the first clutch to apply a torque equal to or greater than the first torque from the propeller shaft to the sub-shaft after the connection determination unit determines that the second clutch is connected.

4. The control system according to claim 1, further comprising:
a communication device connected to the first control unit to receive a connection request,
wherein the first control unit is configured to start to control the first clutch to apply the first torque to the sub-shaft upon determining that the communication device receives the connection request.

5. The control system according to claim 4, wherein the communication device is configured to receive a disconnection request,
wherein the first control unit is configured to control the first clutch to reduce a torque applied to the sub-shaft to the first torque upon determining that the communication device receives the disconnection request, and
wherein the second control unit is configured to disconnect the second clutch after the first control unit reduces the torque to the first torque.

6. The control system according to claim 1, wherein the first axle is a front axle and the second axle is a rear axle.

7. The control system according to claim 1, wherein the motor is an internal combustion engine.

8. The control system according to claim 1, wherein the motor is an electric motor.

9. A control system configured to control a connection between a motor and a first axle in an all-wheel drive vehicle that includes the first axle temporary driven by the motor, a second axle permanently connected to the motor via a propeller shaft, and a sub-shaft that drivingly connects the propeller shaft and the first axle, the control system comprising:
a first clutch configured to disconnectably connect the propeller shaft and the sub-shaft;
a second clutch configured to disconnectably connect the sub-shaft and the first axle;
a synchrony determination unit configured to determine that the second clutch is connectable;
a connection determination unit configured to determine that the second clutch is connected;
a first control unit configured to control the first clutch to continue applying a first torque from the propeller shaft to the sub-shaft until the connection determination unit determines that the second clutch is connected;
a second control unit configured to connect the second clutch in response to a determination of the synchro determination unit that the second clutch is connectable; and
a communication device connected to the first control unit to receive a connection request;
wherein the first control unit is configured to start to control the first clutch to apply the first torque to the sub-shaft upon determining that the communication device receives the connection request;
wherein the communication device is configured to receive a disconnection request;
wherein the first control unit is configured to control the first clutch to reduce a torque applied to the sub-shaft to the first torque upon determining that the communication device receives the disconnection request; and
wherein the second control unit is configured to disconnect the second clutch after the first control unit reduces the torque to the first torque.

10. A control system configured to control a connection between a motor and a first axle in an all-wheel drive vehicle that includes the first axle temporary driven by the motor, a second axle permanently connected to the motor via a propeller shaft, and a sub-shaft that drivingly connects the propeller shaft and the first axle, the control system comprising:
a first clutch configured to disconnectably connect the propeller shaft and the sub-shaft;
a second clutch configured to disconnectably connect the sub-shaft and the first axle;
a synchrony determination unit configured to determine that the second clutch is connectable;
a connection determination unit configured to determine that the second clutch is connected;
a first control unit configured to control the first clutch to continue applying a first torque from the propeller shaft to the sub-shaft until the connection determination unit determines that the second clutch is connected; and
a second control unit configured to connect the second clutch in response to a determination of the synchro determination unit that the second clutch is connectable;
wherein the first control unit is configured to control the first clutch to apply a torque equal to or greater than the first torque from the propeller shaft to the sub-shaft after the connection determination unit determines that the second clutch is connected.

* * * * *